(12) United States Patent
Yaguchi et al.

(10) Patent No.: US 8,057,591 B2
(45) Date of Patent: Nov. 15, 2011

(54) NON-ASBESTOS ORGANIC FRICTION MATERIAL

(75) Inventors: Mitsuaki Yaguchi, Gunma (JP); Shinya Kaji, Gunma (JP)

(73) Assignee: Nisshinbo Industries, Inc., Tokyo (JP)

( * ) Notice: Subject to any disclaimer, the term of this patent is extended or adjusted under 35 U.S.C. 154(b) by 163 days.

(21) Appl. No.: 12/404,969

(22) Filed: Mar. 16, 2009

(65) Prior Publication Data
US 2009/0239076 A1    Sep. 24, 2009

(30) Foreign Application Priority Data
Mar. 21, 2008 (JP) ................. 2008-073323

(51) Int. Cl.
C09K 3/14 (2006.01)
C08J 5/14 (2006.01)
(52) U.S. Cl. ........................... 106/36; 523/149
(58) Field of Classification Search .......... 106/36; 523/149
See application file for complete search history.

(56) References Cited

U.S. PATENT DOCUMENTS
4,722,950 A * 2/1988 Miller ............... 523/156
2002/0086159 A1 * 7/2002 Horiya et al. ........... 428/408

FOREIGN PATENT DOCUMENTS
| JP | 58180573 | * | 10/1983 |
| JP | H08-227866 A | | 9/1996 |
| JP | 2000-219872 | * | 8/2000 |
| JP | 2004-155843 A | | 6/2004 |
| JP | 2006-249244 | * | 9/2006 |
| JP | 2007-056063 A | | 3/2007 |
| JP | 2007-112952 A | | 5/2007 |
| JP | 2007-191010 A | | 8/2007 |
| JP | 2007-326999 A | | 12/2007 |

* cited by examiner

*Primary Examiner* — Shuangyi Abu Ali
(74) *Attorney, Agent, or Firm* — Apex, Juris, pllc; Tracy M. Heims

(57) ABSTRACT

To provide, without increasing the number of manufacturing steps, a friction material that can effectively inhibit water fade, provide good brake effectiveness and a good wear resistance, and give low aggressiveness against the mating surface. In the friction material comprising the inorganic abrasive material and lubricant, the inorganic abrasive material includes 0.5-10 volume % of the inorganic particle relative to the total amount of the friction material, with Mohs' hardness of 5-8 and the average particle diameter of 0.5-10 μm, and the graphite and the petroleum coke in amount of 8-15 volume % relative to the total amount of the friction material. Proportion of the graphite and the petroleum coke is 2:8-3:7 volume ratio, and the average particle diameter of the petroleum coke is 400-900 μm.

1 Claim, 6 Drawing Sheets

FIG. 1

| | Embodiment No. | 1 | 2 | 3 | 4 | 5 | 6 | 7 | 8 |
|---|---|---|---|---|---|---|---|---|---|
| Composition Volume % | Straight Phenolic Resin | 18 | 18 | 18 | 18 | 18 | 18 | 18 | 18 |
| | p-Aramid Pulp | 8 | 8 | 8 | 8 | 8 | 8 | 8 | 8 |
| | Copper Cutting Fiber | 4 | 4 | 4 | 4 | 4 | 4 | 4 | 4 |
| | Cashew Dust | 15 | 15 | 15 | 15 | 15 | 15 | 15 | 15 |
| | Rubber Dust | 5 | 5 | 5 | 5 | 5 | 5 | 5 | 5 |
| | Plate-Like Shape Potassium hexatitanate | 7 | 7 | 7 | 7 | 7 | 7 | 7 | 7 |
| | Calcium Hydroxide | 5 | 5 | 5 | 5 | 5 | 5 | 5 | 5 |
| | Barium Sulfate | 23 | 23 | 23 | 23 | 23 | 23 | 23 | 27.5 |
| | Calcium Oxide (Mohs' hardness 4) 10 $\mu$m | | | | | | | | |
| | Magnetite(Fe3O4) (Mohs' hardness 6) 10 $\mu$m | – | – | – | – | – | – | – | – |
| | Zirconium Oxide(Mohs' hardness 7) 0.1 $\mu$m | – | – | – | – | – | – | – | – |
| | Zirconium Oxide(Mohs' hardness 7) 0.5 $\mu$m | 5 | – | – | – | – | – | – | – |
| | Zirconium Oxide(Mohs' hardness 7) 5 $\mu$m | – | 5 | – | 5 | 5 | 5 | 5 | 0.5 |
| | Zirconium Oxide(Mohs' hardness 7) 10 $\mu$m | – | – | 5 | – | – | – | – | – |
| | Zirconium Oxide(Mohs' hardness 7) 20 $\mu$m | – | – | – | – | – | – | – | – |
| | Silicon Carbide (Mohs' hardness 9) 5 $\mu$m | – | – | – | – | – | – | – | – |
| | Graphite 200 $\mu$m | | | | | | 2 | | |
| | Graphite 300 $\mu$m | 2 | 2 | 2 | 2 | 2 | – | – | 2 |
| | Graphite 500 $\mu$m | – | – | – | – | – | – | 2 | – |
| | Petroleum Coke 200 $\mu$m | – | – | – | – | – | – | – | – |
| | Petroleum Coke 400 $\mu$m | – | – | – | 8 | – | – | – | – |
| | Petroleum Coke 600 $\mu$m | 8 | 8 | 8 | – | – | 8 | 8 | 8 |
| | Petroleum Coke 900 $\mu$m | – | – | – | – | 8 | – | – | – |
| | Petroleum Coke 1200 $\mu$m | – | – | – | – | – | – | – | – |
| | Total | 100 | 100 | 100 | 100 | 100 | 100 | 100 | 100 |
| Remarks | Total amount of Graphite and Petroleum Coke | 10 | 10 | 10 | 10 | 10 | 10 | 10 | 10 |
| | Graphite-Petroleum Coke Ratio | 2:8 | 2:8 | 2:8 | 2:8 | 2:8 | 2:8 | 2:8 | 2:8 |

FIG. 2

| | Embodiment No. | 9 | 10 | 11 | 12 | 13 | 14 | 15 |
|---|---|---|---|---|---|---|---|---|
| Composition Volume % | Straight Phenolic Resin | 18 | 18 | 18 | 18 | 18 | 18 | 18 |
| | p-Aramid Pulp | 8 | 8 | 8 | 8 | 8 | 8 | 8 |
| | Copper Cutting Fiber | 4 | 4 | 4 | 4 | 4 | 4 | 4 |
| | Cashew Dust | 15 | 15 | 15 | 15 | 15 | 15 | 15 |
| | Rubber Dust | 5 | 5 | 5 | 5 | 5 | 5 | 5 |
| | Plate-Like Shape Potassium hexatitanate | 7 | 7 | 7 | 7 | 7 | 7 | 7 |
| | Calcium Hydroxide | 5 | 5 | 5 | 5 | 5 | 5 | 5 |
| | Barium Sulfate | 18 | 25 | 18 | 23 | 23 | 23 | 23 |
| | Calcium Oxide (Mohs' hardness 4) 10 $\mu$m | | | | | | | |
| | Magnetite(Fe3O4) (Mohs' hardness 6) 10 $\mu$m | – | – | – | – | – | – | 5 |
| | Zirconium Oxide(Mohs' hardness 7) 0.1 $\mu$m | – | – | – | – | – | – | – |
| | Zirconium Oxide(Mohs' hardness 7) 0.5 $\mu$m | – | – | – | – | – | – | – |
| | Zirconium Oxide(Mohs' hardness 7) 5 $\mu$m | 10 | 5 | 5 | 5 | 5 | 5 | – |
| | Zirconium Oxide(Mohs' hardness 7) 10 $\mu$m | – | – | – | – | – | – | – |
| | Zirconium Oxide(Mohs' hardness 7) 20 $\mu$m | – | – | – | – | – | – | – |
| | Silicon Carbide (Mohs' hardness 9) 5 $\mu$m | – | – | – | – | – | – | – |
| | Graphite 200 $\mu$m | | | | | | | |
| | Graphite 300 $\mu$m | 2 | 1.6 | 3 | 2 | 2 | 3 | 2 |
| | Graphite 500 $\mu$m | – | – | – | – | – | – | – |
| | Petroleum Coke 200 $\mu$m | – | – | – | 8 | – | – | – |
| | Petroleum Coke 400 $\mu$m | – | – | – | – | – | – | – |
| | Petroleum Coke 600 $\mu$m | 8 | 6.4 | 12 | – | – | 7 | 8 |
| | Petroleum Coke 900 $\mu$m | – | – | – | – | – | – | – |
| | Petroleum Coke 1200 $\mu$m | – | – | – | – | 8 | – | – |
| | Total | 100 | 100 | 100 | 100 | 100 | 100 | 100 |
| Remarks | Total amount of Graphite and Petroleum Coke | 10 | 8 | 15 | 10 | 10 | 10 | 10 |
| | Graphite-Petroleum Coke Ratio | 2:8 | 2:8 | 2:8 | 2:8 | 2:8 | 3:7 | 2:8 |

FIG. 3

| | Comparative Example No. | 1 | 2 | 3 | 4 | 5 | 6 | 7 | 8 | 9 | 10 |
|---|---|---|---|---|---|---|---|---|---|---|---|
| Composition Volume % | Straight Phenolic Resin | 18 | 18 | 18 | 18 | 18 | 18 | 18 | 18 | 18 | 18 |
| | p-Aramid Pulp | 8 | 8 | 8 | 8 | 8 | 8 | 8 | 8 | 8 | 8 |
| | Copper Cutting Fiber | 4 | 4 | 4 | 4 | 4 | 4 | 4 | 4 | 4 | 4 |
| | Cashew Dust | 15 | 15 | 15 | 15 | 15 | 15 | 15 | 15 | 15 | 15 |
| | Rubber Dust | 5 | 5 | 5 | 5 | 5 | 5 | 5 | 5 | 5 | 5 |
| | Plate-Like Shape Potassium hexatitanate | 7 | 7 | 7 | 7 | 7 | 7 | 7 | 7 | 7 | 7 |
| | Calcium Hydroxide | 5 | 5 | 5 | 5 | 5 | 5 | 5 | 5 | 5 | 5 |
| | Barium Sulfate | 18 | 27.7 | 13 | 23 | 23 | 23 | 28 | 13 | 23 | 23 |
| | Calcium Oxide (Mohs' hardness 4) 10 $\mu$m | | | | | 5 | | | | | |
| | Magnetite(Fe3O4) (Mohs' hardness 6) 10 $\mu$m | – | – | – | – | – | – | – | – | – | – |
| | Zirconium Oxide(Mohs' hardness 7) 0.1 $\mu$m | 10 | – | – | – | – | – | – | – | – | – |
| | Zirconium Oxide(Mohs' hardness 7) 0.5 $\mu$m | – | – | – | – | – | – | – | – | – | – |
| | Zirconium Oxide(Mohs' hardness 7) 5 $\mu$m | – | 0.3 | 15 | – | – | – | 5 | 5 | 5 | 5 |
| | Zirconium Oxide(Mohs' hardness 7) 10 $\mu$m | – | – | – | – | – | – | – | – | – | – |
| | Zirconium Oxide(Mohs' hardness 7) 20 $\mu$m | – | – | – | 5 | – | – | – | – | – | – |
| | Silicon Carbide (Mohs' hardness 9) 5 $\mu$m | – | – | – | – | – | 5 | – | – | – | – |
| | Graphite 200 $\mu$m | | | | | | | | | | |
| | Graphite 300 $\mu$m | 2 | 2 | 2 | 2 | 2 | 2 | 1 | 4 | 1 | 4 |
| | Graphite 500 $\mu$m | – | – | – | – | – | – | – | – | – | – |
| | Petroleum Coke 200 $\mu$m | – | – | – | – | – | – | – | – | – | – |
| | Petroleum Coke 400 $\mu$m | – | – | – | – | – | – | – | – | – | – |
| | Petroleum Coke 600 $\mu$m | 8 | 8 | 8 | 8 | 8 | 8 | 4 | 16 | 9 | 6 |
| | Petroleum Coke 900 $\mu$m | – | – | – | – | – | – | – | – | – | – |
| | Petroleum Coke 1200 $\mu$m | – | – | – | – | – | – | – | – | – | – |
| | Total | 100 | 100 | 100 | 100 | 100 | 100 | 100 | 100 | 100 | 100 |
| Remarks | Total amount of Graphite and Petroleum Coke | 10 | 10 | 10 | 10 | 10 | 10 | 5 | 20 | 10 | 10 |
| | Graphite-Petroleum Coke Ratio | 2:8 | 2:8 | 2:8 | 2:8 | 2:8 | 2:8 | 2:8 | 2:8 | 1:9 | 4:6 |

FIG. 4

| | Embodiment No. | 1 | 2 | 3 | 4 | 5 | 6 | 7 | 8 |
|---|---|---|---|---|---|---|---|---|---|
| Evaluation Result | Water Recovery Performance | ○ | ◎ | ◎ | ◎ | ◎ | ◎ | ○ | ○ |
| | Wear Resistance | ◎ | ◎ | ◎ | ◎ | ◎ | ○ | ◎ | ◎ |
| | Aggressiveness against Mating Surface | ◎ | ◎ | ○ | ◎ | ◎ | ○ | ◎ | ◎ |

FIG. 5

| Embodiment No. | | 9 | 10 | 11 | 12 | 13 | 14 | 15 |
|---|---|---|---|---|---|---|---|---|
| Evaluation Result | Water Recovery Performance | ◎ | ◎ | ○ | ◎ | ◎ | ○ | ○ |
| | Wear Resistance | ○ | ○ | ◎ | ○ | ○ | ◎ | ◎ |
| | Aggressiveness against Mating Surface | ○ | ◎ | ◎ | ◎ | ◎ | ◎ | ◎ |

FIG. 6

| Comparative Example No. | | 1 | 2 | 3 | 4 | 5 | 6 | 7 | 8 | 9 | 10 |
|---|---|---|---|---|---|---|---|---|---|---|---|
| Evaluation Result | Water Recovery Performance | × | × | ◎ | ◎ | × | ◎ | ◎ | × | ◎ | × |
| | Wear Resistance | ◎ | ◎ | × | × | ◎ | × | × | ◎ | × | ◎ |
| | Aggressiveness against Mating Surface | ◎ | ◎ | × | × | ◎ | × | ○ | ◎ | ○ | ◎ |

NON-ASBESTOS ORGANIC FRICTION MATERIAL

CROSS-REFERENCE TO RELATED APPLICATION AND CLAIM OF PRIORITY

The present application claims the benefit under 35 U.S.C. section 119(a) of Japanese Patent Application filed in the Japan Patent Office on Mar. 21, 2008 and assigned serial number 2008-73323, the disclosure of which is incorporated herein by reference.

FIELD OF THE INVENTION

This invention relates to a friction material used in an automobile brake device and particularly relates to a friction material that effectively inhibits water fade.

BACKGROUND OF THE INVENTION

Conventional automobile brake devices are disc brake devices or drum brake devices that use a brake pad or brake shoe as a friction member which is formed by affixing the friction material on a metal base member.

The friction material especially used in the brake pad may be classified into three types, i.e., semi-metallic friction material including a steel fiber as a fiber base material, low steel friction material including a steel fiber in a part of the fiber base material, and Non-Asbestos-Organic (NAO) friction material not including steel fiber as the fiber base material.

The semi-metallic friction material is characterized by having a high wear resistance; the low steel friction material is characterized by having highly effective braking; and the NAO friction material is characterized by having a minimal brake noise occurrence.

In recent years there is a demand for minimal brake noise occurrence, therefore the NAO friction material with no steel fiber has widely been used in the brake pad. The NAO friction material includes a fiber base material, such as nonferrous metal fiber, organic fiber, and inorganic fiber; a binder, such as thermosetting resin; and a frictional wear modifier, such as an organic filler, an inorganic filler, an inorganic abrasive material, a lubricant, a metal particle and so on.

The NAO friction material minimizes brake noise occurrence, but on the other hand, the use of the NAO friction material decreases the brake effectiveness because a thin water film forms between the friction surface of the friction material and the friction surface of the mating member when water breaks into a gap between both friction surfaces, i.e., the use of the NAO friction material causes water fade.

The Japanese Provisional Patent Publication No. 2007-191010 (Patent Document 1) shows a method of dissolving water fade by controlling the pressure on the friction material against the brake disc.

However, the method of the Patent Document 1 requires a highly precise pressure control mechanism, and therefore a technology to inhibit water fade using improved friction members, such as the brake pad, and without the use of the pressure control mechanism, was demanded.

Water fade can be inhibited by creating sufficient roughness on the friction surface of such as the brake disc or the brake drum. The sufficient roughness reduces the water surface tension, thereby making it difficult to form a thin water film.

The semi-metallic friction materials and low steel friction materials including steel fiber with a large abrasive force, creates sufficient roughness on the friction surface of the brake disc or brake drum, and therefore water fade occurrence is minimized.

However, there is a problem when using NAO friction materials with no steel fiber and a small abrasive force in that it is difficult to create sufficient roughness on the friction surface of the brake disc or brake drum and therefore water fade tends to occur.

In order to increase the abrasive force, the inorganic abrasive material to be applied in the friction material may be hardened; the particle diameter may be enlarged; or additives may be increased. However, a problem of failing to meet other required performance arises because these changes of the friction material contribute to lowering the wear resistance and heighten the aggressiveness against the mating surface (aggressiveness against the surface of the mating member).

The Japanese Provisional Patent Publication No. H08-2278866 (Patent Document 2) shows a brake pad that improves drainage and inhibits water fade occurrence by using multiple slits on the friction surface of the brake pad, where the slits are extending from an approximately center line to both ends in a longitudinal direction of the friction material and inclining in a frictional direction of the mating member.

However, in this document, specially designed slots are required, which increase the manufacturing steps.

Also, the Japanese Provisional Patent Publication No. 2007-326999 (Patent Document 3) shows a friction material including a high hardness inorganic abrasive material, and a friction material including an inorganic abrasive material, 5 volume % of graphite, and 0.5-3 volume % of coke is shown in the embodiment.

However, effective inhibition of water fade cannot be expected in the friction material in the Patent Document 3.

This is due to an excessive amount of graphite addition. Graphite has a crystal structure with laminated two-dimension graphite sheet layers of honeycomb structure, and when a shearing force is applied it generates interlaminar slide indicating fine lubricant function; therefore, graphite has widely been used as a lubricant of the friction material. However, graphite is crystalline and tends to grow a film on the friction surface of the mating member and thus increases the thickness thereof.

This thickened graphite film hinders the abrasive function of the inorganic abrasive material, and therefore creating sufficient roughness on the friction surface of the mating member cannot be realized, which makes it easy to form the thin water film and therefore water fade tends to occur.

The Japanese Provisional Patent Publication No. 2004-155843 (Patent Document 4), Japanese Provisional Patent Publication No. 2007-056063 (Patent Document 5), and Japanese Provisional Patent Publication No. 2007-112952 (Patent Document 6), disclose the invention of friction materials made of the low steel friction material, and where petroleum coke is added to the graphite as lubricant to heighten the wear resistance.

However, the low steel friction material rarely has a problem of water fade occurrence, and there is no explanation as to the relation between the friction material composition and water fade.

[Patent Document 1] Japanese Provisional Patent Publication No. 2007-191010

[Patent Document 2] Japanese Provisional Patent Publication No. H08-227866

[Patent Document 3] Japanese Provisional Patent Publication No. 2007-326999

[Patent Document 4] Japanese Provisional Patent Publication No. 2004-155843

[Patent Document 5] Japanese Provisional Patent Publication No. 2007-056063

[Patent Document 6] Japanese Provisional Patent Publication No. 2007-112952

SUMMARY OF THE INVENTION

An object of this invention is to provide a friction material that effectively inhibits water fade, provides good brake effectiveness, a good wear resistance, and low aggressiveness against the mating surface without increasing the number of steps to manufacture.

The inventor of this invention focused on removing an element of hindering the abrasive function rather than increasing the abrasive force of the inorganic abrasive material, and contrary to the traditional practice of maximizing the additional amount of graphite without significantly decreasing the frictional coefficient so as to improve the wear resistance, the inventor tried to decrease the additional amount of graphite based on the theory that the film formed on the graphite hinders the abrasive function of the inorganic abrasive material.

Petroleum coke is added as lubricant because reducing the amount of graphite causes problems of unstable brake effectiveness and lowering the wear resistance. Petroleum coke is an amorphous material which makes it difficult to grow the film which hinders the abrasive function of the abrasion material.

Then, by including graphite and petroleum coke where the amount of graphite and petroleum coke combined is 8-15 volume % of the total amount of the friction material and a proportion of the graphite to petroleum coke is 2:8-3:7 volume ratio, the wear resistance does not lower, and sufficient roughness can be created on the friction surface of the mating member by the abrasive force without heightening the aggressiveness against the mating surface, thereby effectively inhibiting water fade.

This invention relates to the friction material including particular inorganic abrasive materials and lubricant in a particular proportion, which is based on the following technology.

(1) A friction material comprising: inorganic abrasive material including 0.5-10 volume % of inorganic particles relative to the total amount of the friction material; and lubricant including graphite and petroleum coke in the amount of 8-15 volume % relative to the total amount of the friction material, the inorganic particles are 5-8 Mohs' hardness and an average particle diameter thereof is 0.5-10 μm, and a proportion of graphite and petroleum coke is 2:8-3:7 volume ratio.

(2) The friction material according to (1) wherein the average particle diameter of said petroleum coke is 400-900 μm.

The present invention provides the friction material without increasing the manufacturing steps of the same, which can effectively inhibit water fade, have good brake effectiveness and a good wear resistance, and low aggressiveness against the mating surface.

BRIEF DESCRIPTION OF THE DRAWING(S)

The above and other objects of the present invention will become readily apparent by reference to the following detailed description when considered in conjunction with the accompanying drawings wherein:

FIG. 1 is a table showing Embodiments 1-8 of the raw material composition for the friction material;

FIG. 2 is a table showing Embodiments 9-15 of the raw material composition for the friction material;

FIG. 3 is a table showing Comparative Examples 1-10 of the raw material composition for the friction material;

FIG. 4 is a table showing the performance evaluation results of Embodiments 1-8;

FIG. 5 is a table showing the performance evaluation results of Embodiments 9-15; and FIG. 6 is a table showing the performance evaluation results of Comparative Examples 1-10.

DETAILED DESCRIPTION OF THE PREFERRED EMBODIMENT(S)

In the present invention, inorganic particles, which have 5-8 Mohs' hardness and an average particle diameter thereof is 0.5-10 μm, are used in the amount of 0.5-10 volume % relative to the total amount of the friction material.

The inorganic abrasive material with 5-8 Mohs' hardness can be selected from a group of zirconium silicate (7.5 Mohs' hardness), silicon dioxide (7 Mohs' hardness), zirconium oxide (7 Mohs' hardness), titanium dioxide (6 Mohs' hardness), and magnetite($Fe_3O_4$) (5 Mohs' hardness) or any combination of the items in the group.

If Mohs' hardness is less than 5, no sufficient roughness can be created on the friction surface of the mating member, thereby not providing effective inhibition of water fade while if Mohs' hardness is over 8, the wear resistance is lowered and the aggressiveness against the surface of the mating member heightens.

Here, Mohs's hardness in the present invention uses 10 phase Mohs' hardness.

Furthermore, if the average particle diameter of the inorganic abrasive material is less than 0.5 μm, sufficient roughness cannot be created on the friction surface of the mating member, thereby not providing effective inhibition of water fade.

If the average particle diameter of the inorganic abrasive material is over 10 μm, the wear resistance lowers and the aggressiveness against the mating surface heightens.

If the additional amount of the inorganic abrasive material is less than 0.5 volume %, no sufficient roughness can be created on the mating material, thereby not providing effective inhibition of water fade, while if the additional amount of the inorganic abrasive material is over 10 volume % then the wear resistance is lowered and the aggressiveness against the mating surface heightens.

Here, the average particle diameter of the present invention is 50% particle diameter measured by a Laser Diffraction-type Particle Size Distribution Measuring Method.

The inorganic abrasive material in the present invention has a large abrasive force against the mating member and is shaped in an indeterminate form having corners.

The inorganic abrasive material in the present invention does not include inorganic particles manufactured by melting or electromelting in almost spherical-shape which have 5-8 Mohs' hardness and a small abrasive force against the mating material.

In the present invention, graphite and petroleum coke, in amount of 8-15 volume % relative to the total amount of the friction material, are used as a part of the lubricant.

If the amount of graphite and petroleum coke is less than 8 volume %, no sufficient lubrication function can be expected, which lowers the wear resistance, while if the amount of graphite and petroleum coke is over 15 volume %, the friction coefficient becomes unstable, and thus degrades the brake effectiveness.

Furthermore, too little graphite lowers the wear resistance at high temperatures and too much graphite damages effective inhibition of water fade and therefore graphite and petroleum coke are added so that the proportion of the same becomes 2:9-3:7 volume ratio.

In the present invention, it is preferable to use graphite with an average particle diameter of 200-500 μm, and more preferably 300-400 μm.

If the average particle diameter is too small then the contacting surface area with the mating member is small, which provides insufficient lubricant function and lowers the wear resistance, while if the average particle diameter is too large then the contacting surface area with the mating member is large, which makes it easier to form a film on the mating member and damages effective inhibition of water fade.

Also, natural graphite, artificial graphite, or a combination thereof can be used as graphite.

In the present invention, it is preferable to use petroleum coke with the average particle diameter of 400-900 μm, more preferably 600-700 μm.

If the average particle diameter is too small the contacting surface area with the mating member is small, which provides insufficient lubricant function and lowers the wear resistance, while if the average particle diameter is too large then the petroleum coke tends to drop from the friction material surface, which lowers the wear resistance.

Furthermore, the friction material of the present invention includes fiber base materials, such as nonferrous metal fiber, organic fiber, and inorganic fiber generally used for friction materials; a binder such as a thermosetting resin; a frictional wear modifier, such as an organic filler or an inorganic filler; a lubricant; a metal particle other than the above-identified inorganic abrasive material; graphite and petroleum coke.

A nonferrous metal fiber such as copper, brass, or bronze, an organic fiber such as aramid, acrylic or carbon, and an inorganic fiber such as ceramic, rock wool, or potassium titanate fiber can be named as the fiber base where either a single element or combined multiple elements from the above may be used.

The content of fiber included in the fiber base is preferably 5-60 volume % relative to the total amount of the friction material to secure sufficient mechanical strength, and more preferably 10-50 volume %.

The binder may be a thermosetting resin such as phenolic resin or epoxy resin; a thermosetting resin obtained after modification of phenolic resin or epoxy resin by cashew oil, silicone oil, or various elastomers; a thermosetting resin obtained after dispersing such as the various elastomers and fluorine polymer, where a single element or combined multiple elements from the above may be used.

The content of the binder is preferably 10-30 volume % relative to the total amount of friction material to secure sufficient mechanical strength and a wear resistance, and more preferably 12-25 volume %.

The frictional wear modifier may be an organic filler such as cashew dust, rubber dust (a tire tread rubber pulverized powder); various unvulcanized rubber particle s, various vulcanized rubber particles; an inorganic filler such as barium sulfate, calcium carbonate, calcium hydroxide, vermiculite, mica, and almost spherical inorganic particles; a lubricant such as molybdenum disulfide, tin sulfide, zinc sulfide, and ferric sulfide; and a metal particle such as copper particle, brass particle, zinc particle, and aluminum particle, where a single element or combined multiple elements from the above may be used.

The content of the frictional wear modifier is preferably 40-70 volume % according to the desired frictional wear characteristics relative to the total amount of the friction material, and more preferably 0-70 volume %.

The friction material of the present invention is manufactured through the steps of uniformly mixing a predetermined amount of the above-explained inorganic abrasive material, the graphite, the petroleum coke, the fiber base, the binder, and the frictional wear modifier with a mixer such as a Loedige Mixer or an Eirich Mixer, a step of pre-forming, such as placing the obtained raw mixture in a pre-forming die, a step of heat-pressure-forming such as placing the pre-formed product in a heat forming die to process at the forming temperature of 130-180° C., forming pressure of 15-49 MPa, for 3-10 minutes, a step of heat treating (postcuring) the obtained formed part at 140-250° C. for 2-12 hours, a step of grinding the friction surface, and if necessary and appropriate, the steps of coating, baking, and scorching.

When manufacturing the brake pads at the heat pressure forming step, a metal back plate that was already cleaned, surface treated, and had an adhesive applied thereon, is superposed on the above-stated pre-formed part to form the brake pad.

Manufacturing Method of Friction Material in the Embodiment/Comparative Example

The raw material composition for the friction material, as shown in Tables (Embodiments 1-8: FIG. 1, Embodiments 9-15: FIG. 2. Comparative Examples 1-10: Table 3). is mixed for about 10 minutes by a Loedige Mixer, and the resultant mixture is placed in the pre-forming die to be pre-formed by pressurizing at 35 MPa for 1 minute.

This pre-formed product and the iron back plate, which is pre-cleaned, surface treated, and has adhesive applied thereon, are superposed to be placed in a heat-forming metal die to be heated at the forming temperature of 155° C. and pressurized at the forming pressure of 40 MPa for 5 minutes, heat-treated (postcured) in a heat treatment chamber at 200° C. for 4 hours, coated, baked, and grinded to form the brake pad for automobiles in the Embodiments and the Comparative Examples.

Method of Evaluation

<Effective Inhibition of Water Fade>

The brake pad of Embodiments 1-15 and Comparative Examples 1-10 is installed on a dynamo meter and is tested according to the standard of water recovery test, JASO C406-00 (Automobile-Brake Device-Dynamometer Testing Method), and the water recovery ratio is calculated.

Used caliper brake type: floating type caliper

Inertia: 7.0 kg/m²

Water Recovery Ratio (%)=Minimum friction coefficient at Recovery Test/Average friction coefficient at Baseline Check×100    Formula The evaluation standard for effective inhibition of water fade is:

⊚: 90% or more

○: less than 90%, 80% or more x: less than 80%

<Wear resistance and Aggressiveness Against Mating Surface>

A brake pad for an automobile as in Embodiments 1-15 and Comparative Examples 1-10 is set in the dynamometer to test the same according to a general wear test (initial braking temperature at 200° C.) of JASO C427-88 (Brake Lining, Pad Friction Dynamometer Testing), and the wearing amount of the brake pad and the wearing amount of the brake disc were measured.

Used caliper brake type: floating type caliper
Inertia 7.0 kg/m$^2$
Evaluation standards are as follows:
<Wear resistance> 200° C. Brake Pad Wear Loss
⊚: less than 0.15 mm
○: 0.15 mm or more, less than 0.25 mm
×: 0.25 mm or more
<Aggressiveness Against Mating Surface> Brake Disc Abrasion Loss
⊚: less than 5 μm
○: 5 μm or more, less than 10 μm
×: 10 μm or more Performance evaluation results of Embodiments and Comparative Examples are shown in Tables 4-6.

From the performance evaluation results in Tables 4-6, the friction material, which is involving 0.5-10 volume % of inorganic particle, as the inorganic abrasive material, with Mohs' hardness 5-8 and average particle diameter 0.5-10 μm relative to the entire amount of the friction material, and the graphite and the petroleum coke, as a part of the lubricant, with 8-15 volume % relative to the entire amount of the friction material, where the ratio of the graphite to petroleum coke is 2:8-3:7 in volume ratio, can effectively inhibit water fade and provide a good wear resistance and low aggressiveness against the mating surface.

Furthermore, from the performance evaluation result as shown in Embodiments 2, 4, and 5 of Table 4 and Embodiment 12 and 13 of Table 5, the friction material with added petroleum coke with the average particle diameter of 400-900 μm was found to provide better wear resistance.

INDUSTRIAL APPLICABILITY

The present invention provides a friction material that: does not increase manufacturing steps; can effectively inhibit water fade; provides good brake effectiveness and a good wear resistance; and give low aggressiveness against the mating surface; and the friction material is useful from a productivity point of view. Moreover, the present invention provides, without depending upon the special control system to control the pressure force of the friction material against the brake disc, a practical and useful friction material that can effectively inhibit water fade.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What we claim is:

1. Non-asbestos organic friction material without steel fibers comprising:
   thermosetting resin functioning as a binder;
   inorganic abrasive material including 0.5-10 volume % of inorganic particles relative to the total amount of the friction material; and
   lubricant including graphite having the average particle diameter of 200-500 μm and petroleum coke having the average particle diameter of 600-900 μm in the amount of 8-15 volume % relative to the total amount of the friction material,
   said inorganic particles are 5-8 Mohs' hardness and an average particle diameter thereof is 0.5-10 μm, and a proportion of graphite and petroleum coke is 2:8-3:7 volume ratio.

* * * * *